United States Patent
Ady et al.

(10) Patent No.: US 10,942,558 B2
(45) Date of Patent: *Mar. 9, 2021

(54) USER INTERFACE ADAPTATION BASED ON DETECTED USER LOCATION

(71) Applicant: GOOGLE TECHNOLOGY HOLDINGS LLC, Mountain View, CA (US)

(72) Inventors: Roger W. Ady, Chicago, IL (US); Rachid Alameh, Crystal Lake, IL (US); Paul R. Steuer, Hawthorn Woods, IL (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,623

(22) Filed: Aug. 5, 2019

(65) Prior Publication Data
US 2019/0354162 A1     Nov. 21, 2019

Related U.S. Application Data

(63) Continuation of application No. 15/677,274, filed on Aug. 15, 2017, now Pat. No. 10,372,193, which is a continuation of application No. 14/447,649, filed on Jul. 31, 2014, now Pat. No. 9,746,901.

(51) Int. Cl.
   *G06F 1/3231*     (2019.01)
   *G06F 3/01*     (2006.01)
   *G06F 1/3234*     (2019.01)

(52) U.S. Cl.
   CPC .......... *G06F 1/3231* (2013.01); *G06F 1/3265* (2013.01); *G06F 3/011* (2013.01); *Y02D 10/00* (2018.01)

(58) Field of Classification Search
   CPC ...................................................... G06F 1/3231
   USPC ........................................................... 345/619
   See application file for complete search history.

(56) References Cited

U.S. PATENT DOCUMENTS

| | | | | |
|---|---|---|---|---|
| 8,789,131 | B2 * | 7/2014 | Choi | G06F 3/04883 725/148 |
| 8,970,455 | B2 * | 3/2015 | Thorson | G06F 3/147 345/105 |
| 9,031,581 | B1 * | 5/2015 | Haney | G01S 19/03 455/456.3 |
| 9,293,107 | B2 * | 3/2016 | Hall | G09G 5/00 |
| 9,746,901 | B2 * | 8/2017 | Ady | G06F 1/3265 |
| 9,787,627 | B2 * | 10/2017 | Nishizawa | H04N 21/4788 |
| 10,241,806 | B2 * | 3/2019 | Hall | G09G 5/00 |

* cited by examiner

*Primary Examiner* — Javid A Amini
(74) *Attorney, Agent, or Firm* — Shumaker & Sieffert, P.A.

(57) ABSTRACT

A method is performed at an electronic device that includes a plurality of sensors. The device detects, by a first set of the sensors, information from an environment of the device. The device obtains content for display by the device. It determines, based on the information from the environment, whether a user is in close physical proximity. Based on a determination that the user is in proximity, the device determines using a second set of the sensors a location of the user relative to the device, and an orientation for displaying the content on the display based on the relative location. The device reformats the content for display on the display based on the user location and/or a rotation of the display with respect to the orientation, and displays the reformatted content on the display.

20 Claims, 9 Drawing Sheets

USER INTERFACE ADAPTATION BASED ON DETECTED USER LOCATION

RELATED APPLICATIONS

This application is a continuation of U.S. patent application Ser. No. 15/677,274, filed Aug. 15, 2017, titled "User Interface Adaption Based on Detected User Location," which is a continuation of U.S. patent application Ser. No. 14/447,649, filed Jul. 31, 2014, titled "User Interface Adaption Based on Detected User Location." now U.S. Pat. No. 9,746,901, issued Aug. 29, 2017, each of which is hereby incorporated by reference herein in its entirety.

BACKGROUND

As technology has advanced, the number and types of computing devices available has increased. This has resulted in users increasingly relying on their computing devices to perform a wide variety of different tasks. These different tasks oftentimes involve presenting content on a display of the device for the user to view. Unfortunately, this content is typically displayed in a default manner that the user must change manually to conform to his or her desires, such as by zooming in or zooming out on the content, by changing between portrait and landscape modes, and so forth. This manual changing can be time consuming and annoying for the user, leading to poor user experiences and user frustration with their devices.

BRIEF DESCRIPTION OF THE DRAWINGS

Embodiments of user interface adaptation based on detected user location are described with reference to the following drawings. The same numbers are used throughout the drawings to reference like features and components.

DETAILED DESCRIPTION

User interface adaptation based on detected user location is discussed herein. A computing device detects when a user is in close physical proximity to the computing device, such as within a few feet of the computing device. While the user is in close physical proximity to the computing device, the computing device also detects the location of the user relative to the computing device, and optionally a speed at which the user is moving. The user interface (UI) presented by the computing device is adapted to the location of the user relative to the computing device and optionally to the speed at which the user is moving.

The user interface can be adapted by orienting content presented on a display of the computing device based on the location of the user relative to the computing device. The content is oriented so that the content is presented on the display to provide optimal readability (e.g., for written words or other text) and/or optimal viewability (e.g., for graphics) by the user. Optimal readability by the user refers to written words or other text being displayed such that the user can read approximately horizontally from left to right or right to left based on the typical reading direction given the language displayed (e.g., left to right for English or Spanish, and right to left for Hebrew or Arabic). Optimal viewability by the user refers to graphics being displayed such that the object or scene is viewed approximately "right side up" as opposed to upside down or at an angle with respect to the user. Thus, the content appears on the display "upright" or "right side up" for the user to view. The user interface can also be adapted in other manners based on the location or speed of the user, such as changing colors or the brightness of the display, changing which content is displayed (including zooming in or zooming out on content), and so forth.

The user interface is adapted in the absence of physical manipulation of the computing device by the user. For example, the computing device can be sitting on a table, and as the user approaches the table or moves around the table, the user interface is adapted based on the location, speed, or both of the user. E.g., as the user approaches the table or moves around the table, the content presented on the display is oriented so that at any particular time the content is presented on the display to provide one or both of optimal readability and optimal viewability. The user need not pick up the computing device and rotate or otherwise manipulate the computing device in order to change the user interface; no accelerometers, gyroscopes, and so forth need be implemented in order to change the user interface.

Figure 1:
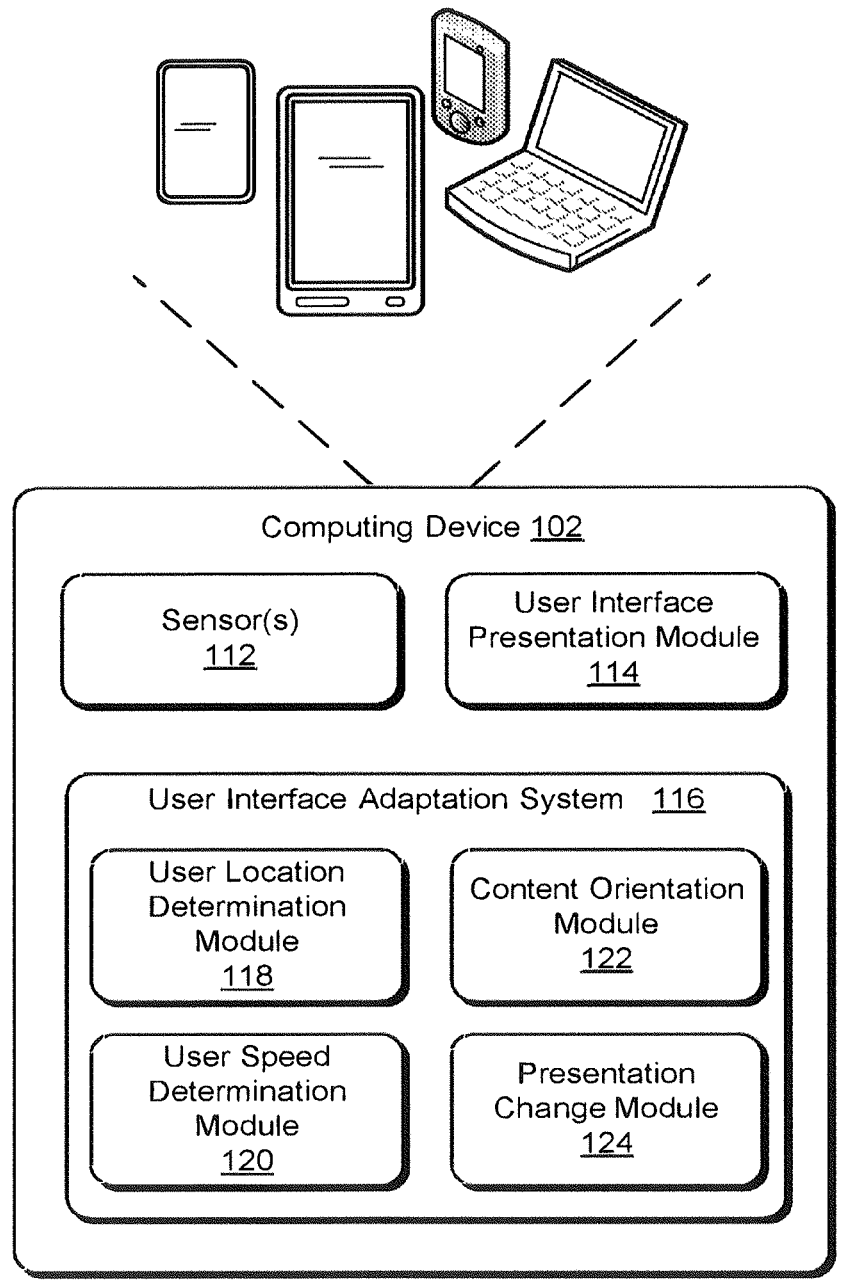
FIG. 1 illustrates an example computing device implementing the user interface adaptation based on detected user location in accordance with one or more embodiments.

FIG. 1 illustrates an example computing device 102 implementing the user interface adaptation based on detected user location in accordance with one or more embodiments. The computing device 102 can be any of a variety of different types of devices, such as a laptop computer, a cellular or other wireless phone, a tablet computer, an entertainment device, an audio and/or video playback device, a server computer, and so forth. The computing device 102 includes one or more sensors 112, a user interface presentation module 114, and a user interface adaptation system 116.

The sensors 112 are one or more sensors that detect a user (a person) in close physical proximity to the computing device 102. A user being in close physical proximity to the computing device 102 refers to the user being close enough to the computing device 102 to be detected by the sensors 112, or to the user being within a threshold distance of the computing device 102 (e.g., within 3 feet or 5 feet of the computing device 102). Different sensors can have the ability to detect users at different ranges, thus the specific distance that is close physical proximity can vary based on the particular sensors 112.

The sensors 112 can include different types of sensors, including low energy (e.g., passive) sensors, higher energy sensors, or combinations thereof. In one or more embodiments, the sensors 112 include one or more motion sensors, such as infrared (IR) motion sensors. Alternatively, other types of motion sensors other than IR sensors can be used, such as ultrasonic motion sensors. Furthermore, the sensors 112 can include other types of sensors that are able to detect the presence of a user in the absence of motion (e.g., when the user is not moving). For example, the sensors 112 can include one or more IR passive sensors (e.g., heat sensors).

Additionally or alternatively, the sensors 112 can include one or more cameras or other imaging components. These cameras or other imaging components can capture images of the area surrounding the computing device 102, which can be analyzed by various control components or modules of the computing device 102 to detect users in close physical proximity to the computing device 102.

Furthermore, the sensors 112 can alternatively or additionally include one or more microphones. These microphones can sense sound waves in the area surrounding the computing device 102, which can be analyzed by various control components or modules of the computing device 102 to detect users in close physical proximity to the computing device 102.

The user interface presentation module 114 manages the presentation of a user interface on a display of the computing device 102, including presenting content on the display as well as presenting content on other devices (e.g., playing back audio content via a speaker). Various different content can be presented on the display as part of the user interface, such as graphics (e.g., video or images), written words or other text, combinations thereof, and so forth. The content to be presented as part of the user interface can be received from various different modules, components, programs, and so forth of the computing device 102.

The user interface adaptation system 116 includes a user location determination module 118, a user speed determination module 120, a content orientation module 122, and a presentation change module 124. The user location determination module 118 determines, based on information obtained from the one or more sensors 112, the location of the user relative to the computing device 102. The location of the user relative to the computing device 102 refers to a direction from the computing device 102 that the user is situated, and optionally a distance away from the computing device 102 that the user is situated.

Figure 2:
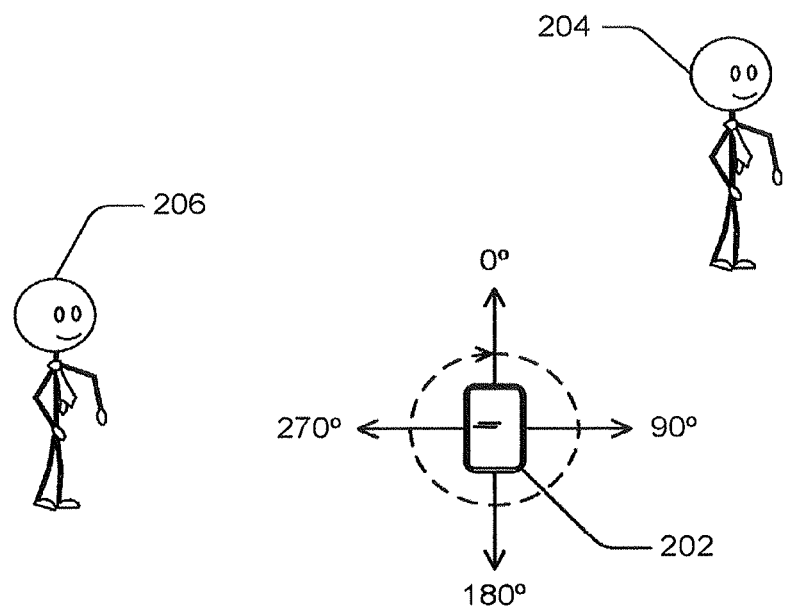
FIG. 2 illustrates an example of the location of the user relative to a computing device in accordance with one or more embodiments.

FIG. 2 illustrates an example of the location of the user relative to a computing device in accordance with one or more embodiments. In the example of FIG. 2, a computing device 202 is illustrated with a 360-degree)(360° coordinate system is established, allowing the direction from the computing device that a user is situated to be identified. For example, the user 204 is situated at a direction of 45° from the computing device 202, and the user 206 is situated at a direction of 270° from the computing device 202.

Although a 360° coordinate system having a particular origin (0° direction) is illustrated in FIG. 2, it is to be appreciated that this is an example and that a 360° coordinate system with different origins can be used, different coordinate systems can be used, and so forth. For example, rather than a 360° coordinate system, compass directions can be used. Thus, the 0° direction illustrated in FIG. 2 could be North, in which case the user 204 is situated at a direction Northeast from the computing device 202, and the user 206 is situated at a direction West from the computing device 202.

Returning to FIG. 1, the user location determination module 118 can determine the location of the user in various different manners based on the types of the sensors 112 and the information that the sensors 112 provide. In one or more embodiments, the sensors 112 detect motion. In such embodiments, the location of the user relative to the computing device 102 is the direction of the detected motion.

Additionally or alternatively, the sensors 112 can include cameras or other imaging components that capture images. Various public or proprietary user detection techniques can be used to detect faces or users within the captured images. The location of the user relative to the computing device 102 can include the direction of the detected faces or users in the captured images. Various public or proprietary techniques can also be used to determine the distance between the computing device 102 and the detected faces or users within the captured images. In such situations, the location of the user relative to the computing device 102 can also include the distance between the user and the computing device 102.

Additionally or alternatively, the sensors 112 can include microphones that sense sound waves. Various public or proprietary techniques can be used to detect a direction from which the sound waves originated (e.g., based on the difference in timing of receipt of the sound waves at different microphones). The location of the user relative to the computing device 102 can include the direction from which the sound waves originated. Various public or proprietary techniques can also be used to determine the distance between the computing device 102 and an origination point of the sound waves (e.g., where the user is situated). In such situations, the location of the user relative to the computing device 102 can also include the distance between the user and the computing device 102.

The user speed determination module 120 determines a speed at which a user is moving relative to the computing device 102. The location of the user can be detected in different manners as discussed above, and various public or proprietary techniques can be used to track the user as he or she moves to different locations over time. For example, the detected face of a user can be tracked, the detected sound waves of a user's voice can be tracked, and so forth. By tracking the location of the user over time, the speed of the user relative to the computing device 102 can be readily determined. Furthermore, by tracking the location of the user over time, a direction of movement of the user can be readily determined. For example, whether the user is moving towards the computing device 102 can be determined, whether the user is moving away from the computing device 102 can be determined, whether the user is moving but keeping approximately a constant distance away from the computing device 102 can be determined, and so forth.

In one or more embodiments, the sensors 112 include different types of sensors, and these different types of sensors are used concurrently or consecutively by the modules 118 or 120 to determine the location or speed of the user relative to the computing device 102. For example, IR motion sensors can be used to detect when a user is in close physical proximity to the computing device 102, and in response to detecting that a user is in close physical proximity to the computing device 102 one or more cameras can be activated to determine the location, speed, or both of the user. By way of another example, if a user is detected as moving relative to the computing device 102, then IR motion sensors can be used to detect the location, speed, or both of the user relative to the computing device 102; however, if the user ceases moving relative to the computing device 102, then one or more cameras or microphones can be activated to determine the location, speed, or both of the user.

The content orientation module 122 determines, based on the location of the user relative to the computing device 102, the orientation for the content presented on the display of the computing device 102. The content orientation module 122 provides an indication of the orientation to the user interface presentation module 114, which presents content of the user interface on the display with the indicated orientation. The content orientation module 122 determines an orientation for the content presented on the display so that the content is presented on the display to provide optimal readability (e.g., for written words or other text) and/or optimal viewability (e.g., for graphics) by the user. For example, if the content is lines of English text, the text is displayed so as to be read from left to right by the user. The orientation for the content presented on the display can be represented in various forms, such as an indication of a number of degrees to rotate the display, an indication of a compass direction that is "left" or "right", and so forth.

The presentation change module 124 determines additional changes to be made to the user interface (e.g., in addition to any changes in the orientation of the content). These additional changes can be based on the location of the user relative to the computing device 102, the speed of the user relative to the computing device 102, or combinations thereof. These changes can include changes to the content that is presented on the display, changes in the manner in which the content is presented on the display, changes in the manner in which the content is otherwise presented (e.g., changes in volume level of audio content), combinations thereof, and so forth as discussed in more detail below.

Although various different individual modules 114 and 118-124 are illustrated, multiple ones of the modules 114 and 118-124 can be combined into a single module, functionality of one or more of the modules 114 and 118-124 can be implemented by another of the modules 114 and 118-124, one or more of the modules 114 and 118-124 can be separated into multiple modules or components, and so forth. The modules 114 and 118-124 can each be implemented in software, firmware, hardware, or combinations thereof.

Figure 3:
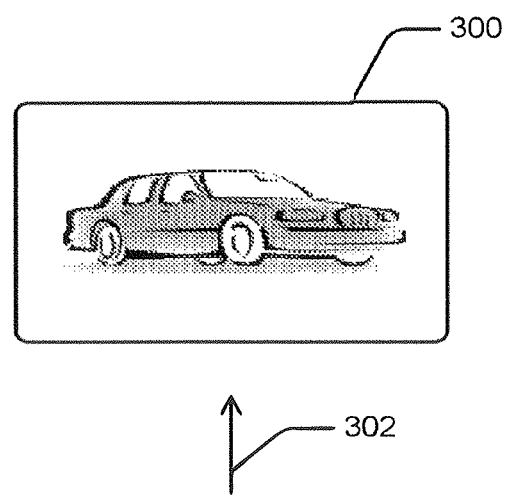
FIG. 3 illustrates an example of the orientation of content presented on a display of a computing device in accordance with one or more embodiments.

FIG. 3 illustrates an example of the orientation of content presented on a display of a computing device in accordance with one or more embodiments. A display 300 is illustrated displaying content that is graphics (a vehicle in this example). Assuming a user is at a location so as to be looking at the display 300 in the direction indicated by arrow 302, the content is presented on the display so as to be viewed approximately "right side up" as opposed to upside down or at an angle with respect to the user.

Figure 4:
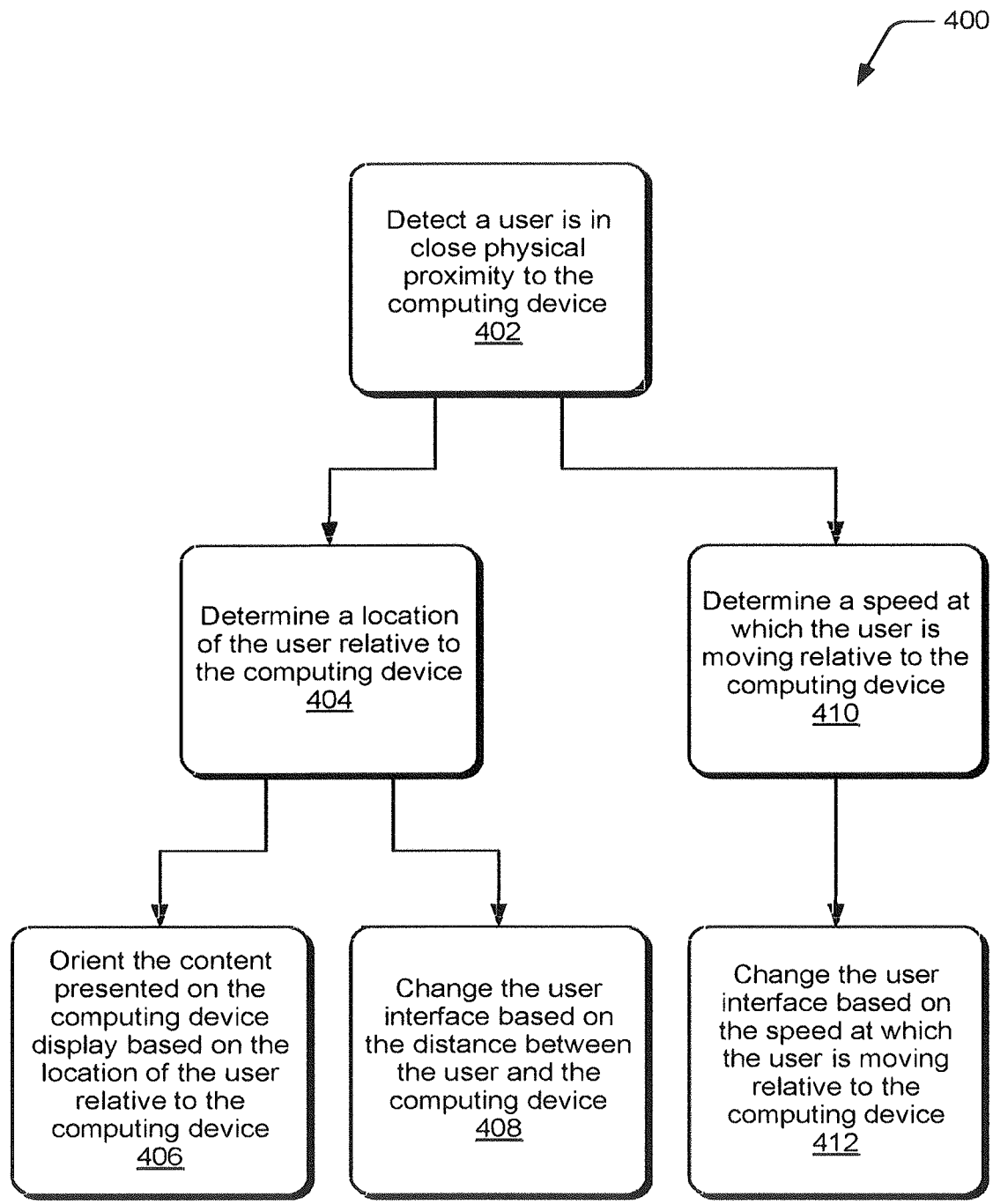
FIG. 4 illustrates an example process for implementing the user interface adaptation based on detected user location in accordance with one or more embodiments.

FIG. 4 illustrates an example process 400 for implementing the user interface adaptation based on detected user location in accordance with one or more embodiments. Process 400 is carried out at least in part by a computing device such as computing device 102 of FIG. 1, and can be implemented in software, firmware, hardware, or combinations thereof. Process 400 is shown as a set of acts and is not limited to the order shown for performing the operations of the various acts. Process 400 is an example process for implementing user interface adaptation based on detected user location; additional discussions of implementing user interface adaptation based on detected user location are included herein with reference to different figures.

In process 400, a user in close physical proximity to the computing device is detected (act 402). The user being in close physical proximity can be detected using various detection techniques and information from various sensors, as discussed above.

A location of the user relative to the computing device is determined (act 404). The location includes at least the direction from the computing device that the user is situated. The location can be determined in various manners based on the types of sensors used, as discussed above.

The content presented on the display of the computing device is oriented based on the location of the user relative to the computing device (act 406). The content orientation module 122 determines an orientation for the content presented on the display so that the content is presented on the display to provide optimal readability (e.g., for written words or other text) and/or optimal viewability (e.g., for graphics) by the user as discussed above.

Figure 5:
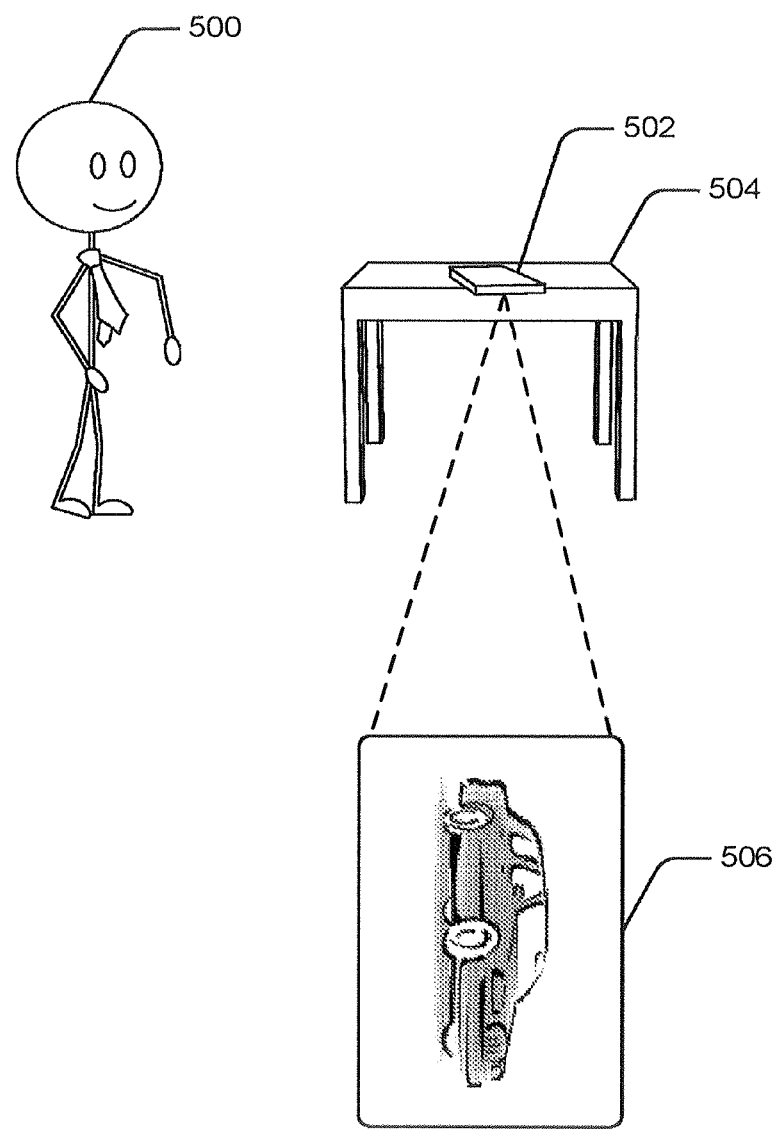
FIG. 5 illustrates an example of the orienting of content presented on a display in accordance with one or more embodiments.

FIG. 5 illustrates an example of the orienting of content presented on a display in accordance with one or more embodiments. A user 500 is approaching a computing device 502 resting on a table 504. The computing device 502 detects the user 500 being in close physical proximity to the computing device 502, and determines the location of the user relative to the computing device 502. The content presented on the display of the computing device 502 is oriented based on the location of the user 500 so that the content is presented on the display to provide optimal readability (e.g., for written words or other text) and/or optimal viewability (e.g., for graphics) by the user. An expanded view 506 of the display of the computing device 502 is illustrated. As can be seen, the content presented on the display is oriented so that the content appears "right side up" to the user 500.

Figure 6:
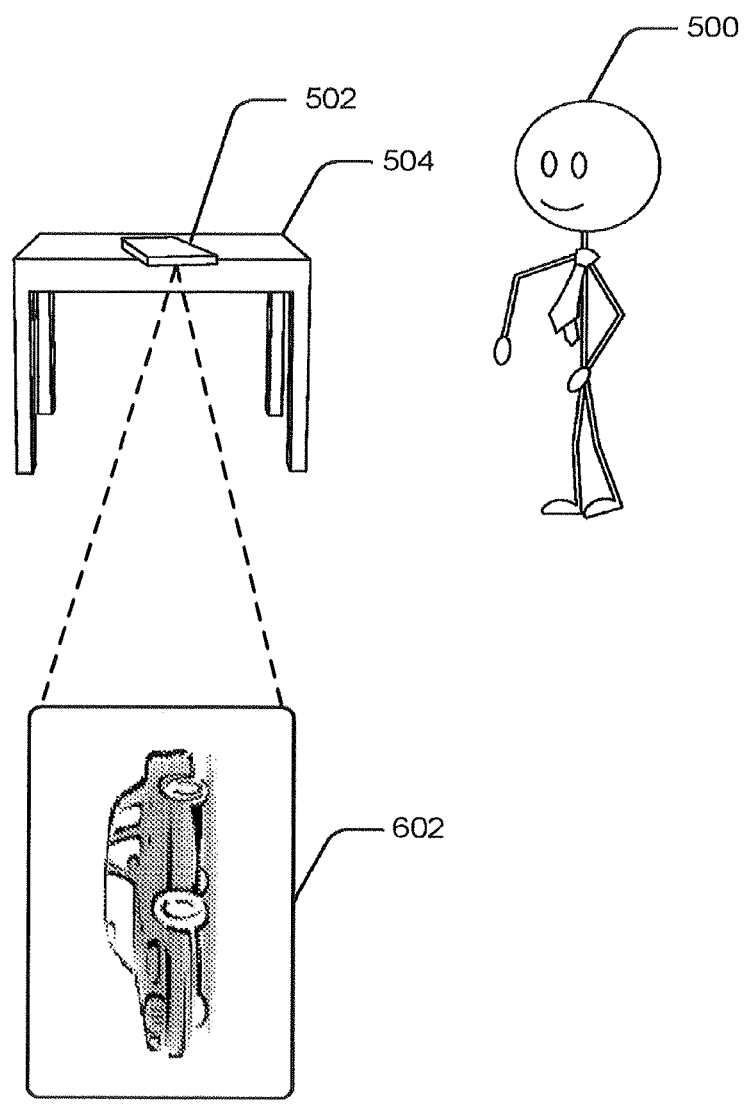
FIG. 6 illustrates another example of the orienting of content presented on a display in accordance with one or more embodiments.
Figure 7:
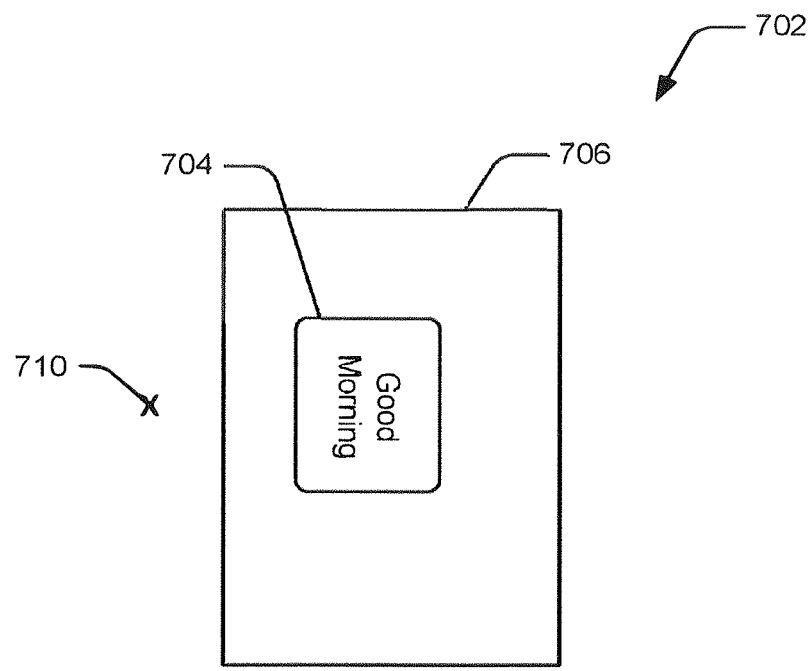
FIGS. 7, 8, 9, and 10 illustrate additional examples of the orienting of content presented on a display in accordance with one or more embodiments.

FIG. 6 illustrates another example of the orienting of content presented on a display in accordance with one or more embodiments. A user 500 is approaching a computing device 502 resting on a table 504, the computing device 502 detects the user 500 being in close physical proximity to the computing device 502, and the computing device 502 determines the location of the user relative to the computing device 502. This is analogous to the example in FIG. 5, although the location of the user relative to the computing device 502 has changed. The content presented on the display of the computing device 502 is oriented based on the location of the user 500 so that the content is presented on the display to provide optimal readability (e.g., for written words or other text) and/or optimal viewability (e.g., for graphics) by the user. An expanded view 602 of the display of the computing device 502 is illustrated. As can be seen, the content presented on the display is oriented so that the content appears "right side up" to the user 500. Thus, regardless of whether the user 500 is at the location relative to the computing device 502 as illustrated in FIG. 5 or the location relative to the computing device 502 as illustrated in FIG. 6, the content presented on the display is oriented so that the content appears "right side up" to the user 500.

FIGS. 7-10 illustrate additional examples of the orienting of content presented on a display in accordance with one or more embodiments. FIGS. 7, 8, 9, and 10 illustrate four different environments 702, 802, 902, and 1002, respectively, in which a computing device 704 is resting flat on a table 706. FIGS. 7, 8, 9, and 10 illustrate an environment 702, 802, 902, and 1002, respectively, with a top-down view, as if looking down at the top of the table 706 (from a viewing point above the table 706). The display of the computing device 704 is visible, and the content presented on the display is written words (the phrase "Good Morning"). In environment 702 of FIG. 7, a user is detected at location 710

(marked by an "X") as being in close physical proximity to the computing device 704. In response, the content is oriented so that the content is presented on the display of the computing device 704 to provide optimal readability for a user at the location 710.

Figure 8:
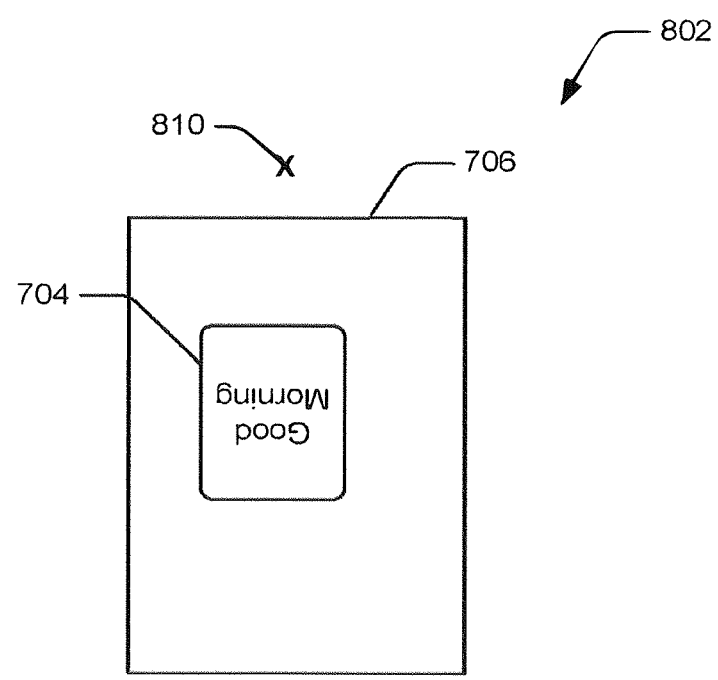
Figure 9:
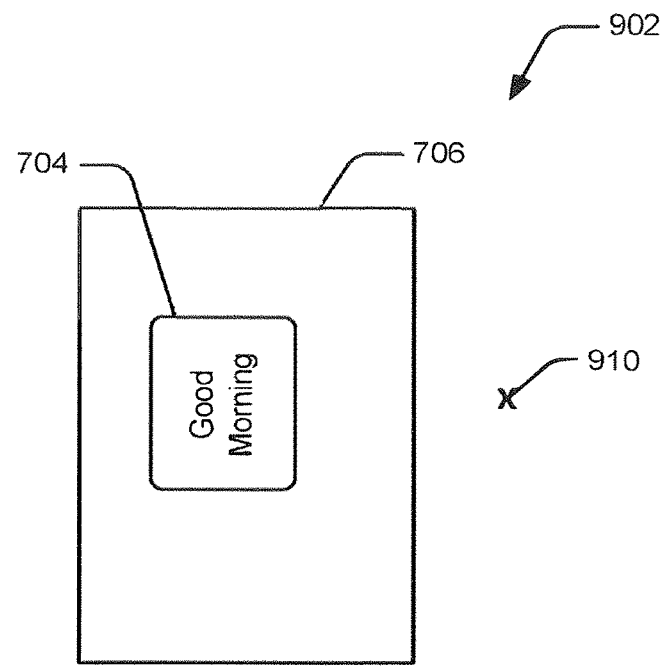
Figure 10:
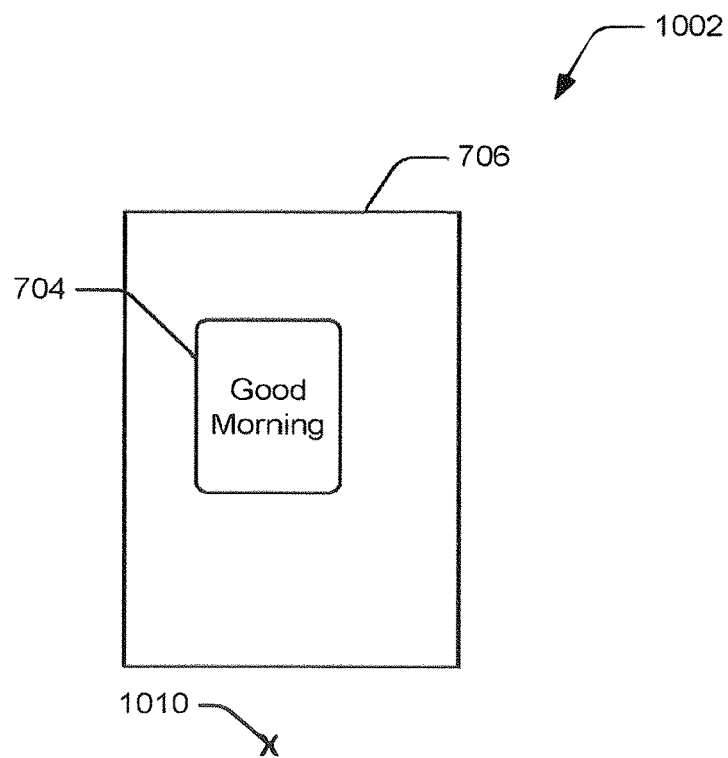

In environment 802 of FIG. 8, a user is detected at location 810 (marked by an "X") as being in close physical proximity to the computing device 704. In response, the content is oriented so that the content is presented on the display of the computing device 704 to provide optimal readability for a user at the location 810. Similarly, in environment 902 of FIG. 9, a user is detected at location 910 (marked by an "X") as being in close physical proximity to the computing device 704. In response, the content is oriented so that the content is presented on the display of the computing device 704 to provide optimal readability for a user at the location 910. And, in environment 1002 of FIG. 10, a user is detected at location 1010 (marked by an "X") as being in close physical proximity to the computing device 704. In response, the content is oriented so that the content is presented on the display of the computing device 704 to provide optimal readability for a user at the location 1010.

Returning to FIG. 4, in one or more embodiments orientation of the content presented on the display in act 406 is changed in particular increments. Different increments can be used, such as increments of 1°, increments of 90° (e.g., corresponding to a landscape orientation, a portrait orientation, an upside down landscape orientation, and an upside down portrait orientation), and so forth. In such embodiments, the content presented on the display is oriented in act 406 to an increment that is close to the determined direction of the user. The increment that is close to the determined direction of the user can be the increment that is closest to the direction of the user, or alternatively another increment. For example, if the increments are 90° and the direction of the user as determined in act 404 is 80°, then the orientation of the content presented on the display can be the 90° increment. E.g., if the user 500 of FIG. 6 were determined to be at a direction of 80° relative to the computing device 502, the display of the content can be at 90° (such as illustrated in expanded view 602).

Additionally, the location of the user relative to the computing device as determined in act 404 can also include a distance between the user and the computing device as discussed above. The user interface is optionally changed based on the distance between the user and the computing device (act 408). This change to the user interface can be a further change in addition to orienting the content presented on the display in act 406, or alternatively can be performed without changing the orientation of the content presented on the display in act 406.

Various different changes to the user interface can be made in act 408. The changes can be changes as to which content is displayed, including enlarging (e.g., zooming in or increasing the magnification of) the content presented on the display or reducing (e.g., zooming out or reducing the magnification of) the content presented on the display. For example, the content presented on the display can be enlarged for users at least a threshold distance (e.g., a particular number of feet) away from the computing device, and reduced for users within the threshold distance of the computing device. The amount of enlarging or reducing of the content presented on the display can also vary in multiple steps or increments as the user gets further from or closer to the computing device. For example, the content presented on the display can be enlarged one amount if the user is at least a first threshold distance away from the computing device, the content presented on the display can be enlarged another amount if the user is at least a second threshold distance away from the computing device, the content presented on the display can be enlarged yet another amount if the user is at least a third threshold distance away from the computing device, and so forth.

This enlarging of the content presented on the can include enlarging the content so that all of the content cannot be displayed at the same time, and only a portion of the content is displayed at any given time. In such situations, the content can be presented in a fixed mode in which a particular portion of the content is displayed and the particular portion that is displayed cannot be changed. Alternatively, the content can be presented in a scroll mode in which the particular portion of the content that is displayed can be changed in response to various user inputs to the computing device (e.g., voice commands detected by a microphone of the computing device, hand gestures detected by a camera of the computing device, and so forth). Alternatively, the content can be presented in a banner mode in which the particular portion of the content that is displayed is changed automatically by the computing device. For example, in banner mode a particular portion is changed automatically after every threshold amount of time (e.g., one-half second, one second, three seconds, ten seconds, and so forth). The particular portion is changed so that the one side (e.g., the left side) of the content appears to move off the display to that one side, and new content appears to move onto the display from the opposite side (e.g., the right side), the particular portions wrapping around in a loop so that the content appears to be continually cycled or rotated through. E.g., the content may be the current time of 11:45 pm and the content is enlarged so that only three characters can be displayed at a time. In banner mode, the particular portion displayed would be "11:", and after the threshold amount of time would change to "1:4", and after the threshold amount of time would change to "0:45", and so forth.

Figure 11:
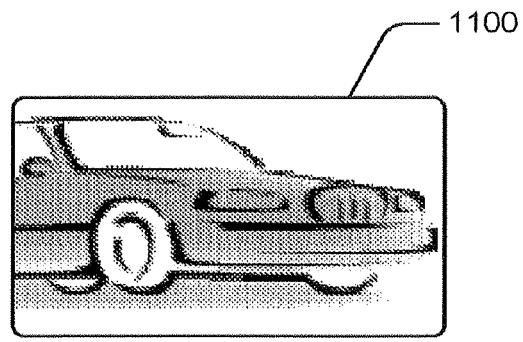
FIGS. 11 and 12 illustrate examples of the enlarging and reducing of content presented on a display in accordance with one or more embodiments.
Figure 12:
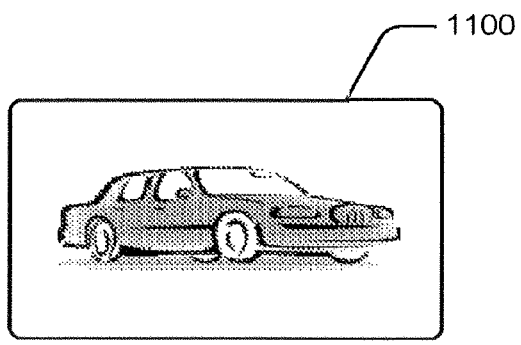

FIGS. 11 and 12 illustrate examples of the enlarging and reducing of content presented on a display in accordance with one or more embodiments. A display 1100 is illustrated displaying content that is graphics (a vehicle). The content is enlarged in FIG. 11 (e.g., in response to the user being at least a threshold distance away from the computing device), preventing all of the content from being displayed at the same time. However, if the user is further away from the device, he or she is more likely to be able to see and understand the content that is displayed despite the distance. The content is reduced in FIG. 12 (e.g., in response to the user not being at least a threshold distance away from the computing device), allowing all of the content to be displayed at the same time. If the user is closer to the device he or she is likely to be able to still see and understand the content that is displayed given his or her closeness to the device.

Returning to FIG. 4, the changes to the user interface can also include changes in what content is displayed. For example, the user interface may display content that is a current time in large numbers if the user is at least a threshold distance away from the computing device, but display content that is the current time in smaller numbers and also display additional information (e.g., a current date, calendar entries for the current date, etc.) if the user is within the threshold distance of the computing device.

The changes to the user interface can also include changes to the manner in which content is displayed. For example, a brightness of the display can be changed, the brightness being increased if the user is at least a threshold distance away from the computing device, and the brightness being decreased if the user is within the threshold distance of the computing device. By way of another example, the colors used to display the content can be changed, such as one color (e.g., green) being used to display content (e.g., a current time) if the user is at least a threshold distance away from the computing device, and another color (e.g., blue) being used to display the content if the user is within the threshold distance of the computing device.

The changes to the user interface can also include changes to content presented in manners other than being displayed, such as the playback of audible content. For example, the volume level of audio playback can be changed, the volume level being increased if the user is at least a threshold distance away from the computing device, and the volume level being decreased if the user is within the threshold distance of the computing device.

Additionally, a speed at which the user is moving relative to the computing device can optionally be determined (act 410). The speed at which the user is moving can be determined in various manners based on the types of sensors used, as discussed above. The user interface is optionally changed based on the speed at which the user is moving relative to the computing device (act 412). This change to the user interface can be a further change in addition to orienting the content presented on the display in act 406 and/or the change in act 408, or alternatively can be performed without changing the orientation of the content presented on the display in act 406 or otherwise changing the user interface in act 408.

Various different changes to the user interface can be made in act 412. The changes can be changes as to which content is displayed, including zooming in (e.g., enlarging) the content or zooming out (e.g., reducing) the content. For example, the content presented on the display can be reduced for users that are moving towards the display at at least a threshold speed (e.g., a particular number of feet per second), the computing device assuming that the user is moving quickly towards his or her device to use it. Similarly, the content presented on the display can be enlarged for users that are not moving towards the computing device at at least the threshold speed. This enlarging of the content can include enlarging the content so that all of the content cannot be displayed at the same time, and only a portion of the content is displayed at any given time.

It should be noted that the user can be detected in act 402 as being in close physical proximity to the computing device using any one or more of the various sensors discussed above. For example, the user can be detected as being in close physical proximity to the computing device by one or more motion sensors of the computing device, and in response the appropriate content (e.g., a lock screen, the content displayed by a particular program running on the computing device, etc.) can be displayed with the proper orientation, as discussed above.

By way of another example, the user can be detected as being in close physical proximity to the computing device by a microphone of the computing device detecting a particular audible input, such as a particular phrase (e.g., "OK Google Now") or other sound. In response to detecting the particular audible input, the computing device wakes up (e.g., transitions to a higher power mode) and invokes listening across multiple microphones. The user can then say what he or she wants the computing device to do (e.g., get a weather forecast by asking "What is the weather forecast"), in response to which the content (the current weather forecast) is re-oriented as appropriate to the detected location of the user. Additional content, such as an audio playback of the current weather forecast, can also be presented by the computing device. This additional content can include the same information as the displayed content, or different information. For example, the audio playback may be a predicted high temperature, low temperature, and chance of precipitation during the next 12 hours. The displayed content, however, can include hourly predicted temperatures for the next 12 hours, hourly chances of precipitation during the next 12 hours, the time of the next sunset, the time of the next sunrise, and so forth.

In one or more embodiments, various ones of acts 404-412 are repeated as a user moves around the computing device. As the user moves around the computing device (e.g., if the user were to walk in a circle around the table 504 of FIG. 5 or 6), his or her location relative to the computing device changes. For example, acts 404 and 406 can be repeated so that the content presented on the display appears to rotate as the user moves around the computing device. Thus, new locations of the user are determined as the user moves and the content presented on the display is oriented based on these new locations. An angular threshold (e.g., 5 degrees, 15 degrees, 45 degrees, and so forth) can optionally be used so that the orientation of the content presented on the display changes only if the user movement relative to the computing device exceeds the angular threshold. Thus, if the user were to move side to side a small amount (less than the angular threshold), the orientation of the content presented on the display would remain unchanged.

A time limit can optionally be imposed on the orienting the content presented on the display in act 406 as acts 404 and 406 are repeated so that the orientation of the content is not changed at greater than a threshold frequency (e.g., not more than once every 3 seconds, once every 5 seconds, once every 10 seconds, and so forth). By imposing this time limit, the content presented on the display does not appear to the user to be constantly moving. Similarly, a time limit can optionally be imposed on the changing of the user interface in one or both of acts 408 and 412 so that the user interface is not changed at greater than the threshold frequency.

Situations can arise in which multiple different users are detected in close physical proximity to the computing device in act 402. In such situations, one of the multiple users is selected as the user for which the location is determined in act 404, the speed is determined in act 410, the content presented on the display is oriented in act 406, and other changes are made to the user interface in acts 408 and 412. The one of the multiple users can be selected using various criteria or characteristics, and various different techniques can be used to determine different criteria or characteristics. For example, beam-forming and voice analysis can be used to identify different voices corresponding to different users and the locations of those different users. By way of another example, face recognition techniques can be used to identify a particular user (e.g., a user that owns or is signed into the computing device). By way of another example, object tracking techniques can be used to identify which users are moving away from the computing device, which users are moving towards the computing device, and so forth.

These various criteria or characteristics can be used in different manners to select the one of the multiple users for acts 404-412. For example, the one of the multiple users that is selected can be the user that is determined to be physically closest to the computing device, the user determined to be moving the fastest, the user having a face that is recognized by the computing device, the user that is moving towards the computing device, and so forth.

It should be noted that which of multiple users is selected for acts 404-412 can change over time. Thus, for example, two different users can be in close physical proximity to the computing device at the same time, and the user that is talking at any given time can be the user that is selected for acts 404-412. Thus, the content orientation is changed and other user interface changes in different manners based on the location, distance, speed, or combinations thereof of the user that is talking at any given time.

Figure 13:
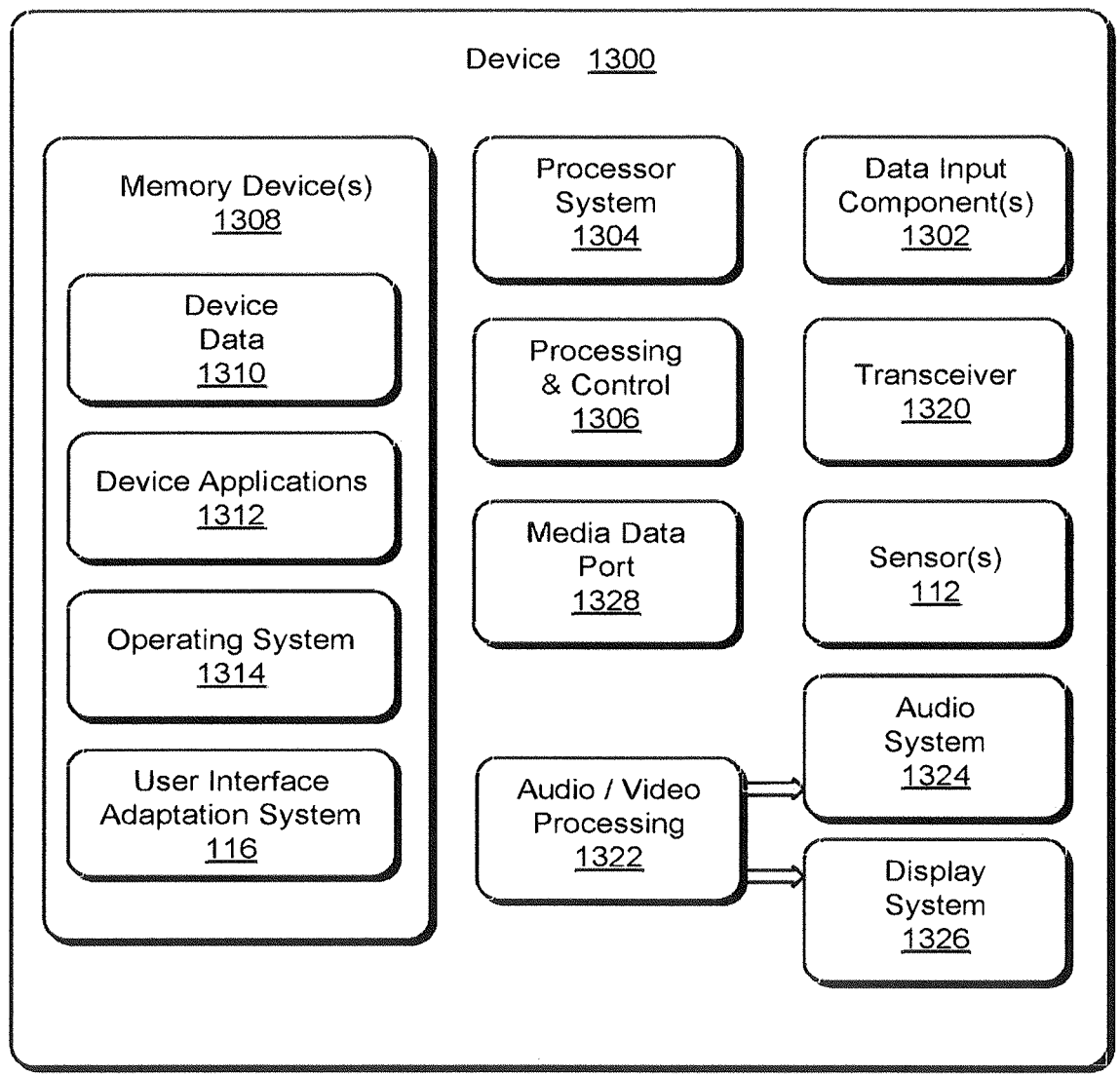
FIG. 13 illustrates an example electronic device that can implement embodiments of the techniques discussed herein.

FIG. 13 illustrates various components of an example electronic device 1300 that can be implemented as a computing device as described with reference to any of the previous FIGS. 1-12. The device 1300 may be implemented as any one or combination of a fixed or mobile device in any form of a consumer, computer, portable, user, communication, phone, navigation, gaming, messaging, Web browsing, paging, media playback, or other type of electronic device such as a computing device 102, 202, or 502 described above.

The electronic device 1300 can include one or more data input components 1302 via which any type of data, media content, or inputs can be received such as user-selectable inputs, messages, music, television content, recorded video content, and any other type of audio, video, or image data received from any content or data source. The data input components 1302 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1302 may also include various other input components such as microphones, touch sensors, keyboards, and so forth.

The electronic device 1300 of this example includes a processor system 1304 (e.g., any of microprocessors, controllers, and the like) or a processor and memory system (e.g., implemented in a system on a chip), which processes computer executable instructions to control operation of the device. A processing system may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1300 can be implemented with any one or combination of software, hardware, firmware, or fixed logic circuitry implemented in connection with processing and control circuits that are generally identified at 1306. Although not shown, the electronic device can include a system bus or data transfer system that couples the various components within the device. A system bus can include any one or combination of different bus structures such as a memory bus or memory controller, a peripheral bus, a universal serial bus, or a processor or local bus that utilizes any of a variety of bus architectures.

The electronic device 1300 also includes one or more memory devices 1308 that enable data storage such as random access memory, nonvolatile memory (e.g., read only memory, flash memory, erasable programmable read only memory, electrically erasable programmable read only memory, etc.), and a disk storage device. A memory device 1308 provides data storage mechanisms to store the device data 1310, other types of information or data (e.g., data backed up from other devices), and various device applications 1312 (e.g., software applications). For example, an operating system 1314 can be maintained as software instructions with a memory device and executed by the processor system 1304.

In one or more embodiments the electronic device 1300 includes a user interface adaptation system 116 and one or more sensors 112, described above. Although represented as a software implementation, modules of the user interface adaptation system 116 may be implemented as any form of a control application, software application, signal processing and control module, firmware that is installed on the device 1300, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

The electronic device 1300 also includes a transceiver 1320 that supports wireless communication with other devices or services allowing data and control information to be sent as well as received by the device 1300. The wireless communication can be supported using any of a variety of different public or proprietary communication networks or protocols such as cellular networks (e.g., third generation networks, fourth generation networks such as Long Term Evolution networks), wireless local area networks such as Wi-Fi networks, and so forth.

The electronic device 1300 can also include an audio or video processing system 1322 that processes audio data or passes through the audio and video data to an audio system 1324 or to a display system 1326. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1328. In implementations the audio system or the display system are external components to the electronic device. Alternatively or in addition, the display system can be an integrated component of the example electronic device, such as part of an integrated touch interface.

Although embodiments of techniques for user interface adaptation based on detected user location have been described in language specific to features or methods, the subject of the appended claims is not necessarily limited to the specific features or methods described. Rather, the specific features and methods are disclosed as example implementations of techniques for user interface adaptation based on detected user location.

What is claimed is:

1. A method performed at an electronic device including a display and a plurality of sensors, comprising:

detecting, by a first set of the sensors, information from an environment of the electronic device;

obtaining content for display by the electronic device;

determining based on the information from the environment of the electronic device whether a user is in close physical proximity to the electronic device; and based on a determination that the user is in proximity to the electronic device:

determining using a second set of the sensors a location of the user relative to the electronic device;

determining based on the location of the user relative to the electronic device an orientation for displaying the content on the display of the electronic device;

reformatting the content for display on the display of the electronic device based on the user location and a rotation of the display with respect to the orientation; and displaying the reformatted content on the display of the electronic device.

2. The method of claim 1, wherein detecting information from the environment of the electronic device includes detecting a voice input from the environment of the electronic device.

3. The method of claim 2, wherein detecting the voice input includes detecting a hotword.

4. The method of claim 2, wherein the voice input includes a request for first information.

5. The method of claim 4, wherein the obtained content is a response to the request for first information.

6. The method of claim 1, wherein the reformatting includes one or more of adjusting a color, brightness, an angle increment, or a size of the information content.

7. The method of claim 1, wherein the display has portrait and landscape display modes.

8. The method of claim 1, further comprising:

determining, based on the information detected by the first set of the sensors, that multiple users are in close proximity to the electronic device;

selecting one of the multiple users, wherein determining the location of the user relative to the electronic device comprises determining the location of the selected user relative to the electronic device; and wherein determining the orientation for displaying the content on the display comprises determining the orientation for displaying the content on the display based on the location of the selected user relative to the electronic device.

9. The method of claim 8, wherein selecting one of the multiple users includes one or more of:

selecting the one of the multiple users who is closest to the electronic device;

selecting the one of the multiple users who is moving fastest;

selecting the one of the multiple users having a face recognized by the electronic device; or selecting the one of the multiple users who is moving towards the electronic device.

10. The method of claim 1, wherein the reformatting and the displaying are performed in the absence of physical manipulation of the electronic device by the user.

11. An electronic device, comprising:

a plurality of sensors;

a display;

one or more processors; and memory storing one or more programs for execution by the one or one or more processors, the one or more programs comprising instructions for:

detecting, by a first set of the sensors, information from an environment of the electronic device;

obtaining content for display by the electronic device;

determining based on the information from the environment of the electronic device whether a user is in close physical proximity to the electronic device; and based on a determination that the user is in proximity to the electronic device:

determining using a second set of the sensors a location of the user relative to the electronic device;

determining based on the location of the user relative to the electronic device an orientation for displaying the content on the display of the electronic device;

reformatting the content for display on the display of the electronic device based on the user location and a rotation of the display with respect to the orientation; and displaying the reformatted content on the display of the electronic device.

12. The electronic device of claim 11, the one or more programs comprising instructions for:

repeating determining the location of the user relative to the electronic device; and changing the orientation for displaying the content on the display of the electronic device as the location of the user relative to the electronic device changes.

13. The electronic device of claim 12, the one or more programs further comprising instructions for: imposing a time limit on changing the orientation for displaying the content on the display of the electronic device so that the orientation for displaying the content is not changed at greater than a threshold frequency.

14. The electronic device of claim 13, the one or more programs further comprising instructions for: changing the orientation for displaying the content on the display of the electronic device only if movement of the user relative to the electronic device exceeds an angular threshold.

15. The electronic device of claim 11, wherein the instructions for reformatting and the displaying are performed in the absence of physical manipulation of the electronic device by the user.

16. A non-transitory computer readable storage medium storing one or more instructions that, when executed, cause one or more processors of an electronic device including a display and a plurality of sensors to:

detect, by a first set of the sensors, information from an environment of the electronic device;

obtain content for display by the electronic device;

determine based on the information from the environment of the electronic device whether a user is in close physical proximity to the electronic device; and based on a determination that the user is in proximity to the electronic device: determine using a second set of the sensors a location of the user relative to the electronic device;

determine based on the location of the user relative to the electronic device an orientation for displaying the content on the display of the electronic device;

reformat the content for display on the display of the electronic device based on the user location and a rotation of the display with respect to the orientation; and display the reformatted content on the display of the electronic device.

17. The non-transitory computer readable storage medium of claim 16, wherein detecting information from the environment of the electronic device includes detecting a voice input from the environment of the electronic device.

18. The non-transitory computer readable storage medium of claim 17, wherein the voice input includes a request for first information.

19. The non-transitory computer readable storage medium of claim 18, wherein the obtained content is a response to the request for first information.

20. The non-transitory computer readable storage medium of claim 16, wherein the reformatting includes one or more of adjusting a color, brightness, an angle increment, or a size of the information content.

\* \* \* \* \*

UNITED STATES PATENT AND TRADEMARK OFFICE
CERTIFICATE OF CORRECTION

Page 1 of 1

PATENT NO. : 10,942,558 B2
APPLICATION NO. : 16/531623
DATED : March 9, 2021
INVENTOR(S) : Roger W. Ady, Rachid M. Alameh and Paul R. Steuer It is certified that error appears in the above-identified patent and that said Letters Patent is hereby corrected as shown below:

On the Title Page

Item (73) replace "Google LLC" with --Google Technology Holdings LLC--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*